Oct. 18, 1955     M. J. GROSS     2,720,973
TRAVELING MEDIUM GRAVITY FILTER
Filed July 12, 1954     7 Sheets-Sheet 1

Fig. 1

INVENTOR
Maurice J. Gross
By Carlson, Pitzner, Hubbard & Wolfe
ATTORNEYS

Oct. 18, 1955 M. J. GROSS 2,720,973
TRAVELING MEDIUM GRAVITY FILTER
Filed July 12, 1954 7 Sheets-Sheet 3

INVENTOR
Maurice J. Gross
By Carlson, Pitzner, Hubbard & Wolfe
ATTORNEYS

Oct. 18, 1955    M. J. GROSS    2,720,973
TRAVELING MEDIUM GRAVITY FILTER
Filed July 12, 1954    7 Sheets-Sheet 4

INVENTOR
Maurice J. Gross
By Carlson, Pitzner, Hubbard & Wolfe
ATTORNEYS

Oct. 18, 1955

M. J. GROSS

2,720,973

TRAVELING MEDIUM GRAVITY FILTER

Filed July 12, 1954

United States Patent Office 2,720,973
Patented Oct. 18, 1955

2,720,973

TRAVELING MEDIUM GRAVITY FILTER

Maurice J. Gross, Rockford, Ill., assignor to Barnes Drill Co., Rockford, Ill., a corporation of Illinois Application July 12, 1954, Serial No. 442,787

20 Claims. (Cl. 210—1.5)

This invention relates to a gravity filter having a flexible filter sheet supported on an endless perforated conveyor to shape the sheet and form a pocket for receiving and supporting a pool of liquid to be filtered, the conveyor and sheet being advanced endwise to bring unused areas into the filtering area. In certain of its aspects, the invention has more particular reference to filters of the above character combined with a magnetic separator for removing magnetic material from the liquid before the liquid is subjected to the filtering action of the sheet.

One object of the invention is to provide a combined magnetic separator and sheet filter which is simple and compact in its construction and more reliable and efficient in operation than prior filters by virtue of the novel arrangement of the magnetic and filter elements in nested relation and to the manner of directing the liquid to be filtered to the separator and filter elements successively.

A more detailed object is to extend the filter sheet in an arc around the lower portion of the magnetic separator drum so as to minimize the space occupied by the combined unit.

Another object is to segregate the portions of the liquid being subjected to the magnetic action and the filtering action through the provision of a partition of novel construction submerged in the pool of liquid on the filter sheet and containing a body of liquid in which the magnetic drum is partially submerged.

Still another object is to improve the filtering action by delivering the liquid to be filtered to the filter sheet in the form of a downwardly falling stream which first encounters the inlet or initially acting edge of the filtering area.

A further object is to seal the side margins of the filter sheet around its supporting disks through the use of a conveyor of novel construction which serves to support the intervening part of the filter sheet.

Still another object is to control the advance of the filter sheet by a float arranged in a novel manner in relation to the magnetic and filtering elements and operating through a drive coupling of novel character to transmit driving power to the filter sheet.

The invention also resides in the novel arrangement of the parts for transmitting power to advance the filter sheet, to the manner of controlling the flow of liquid through the magnetic field and to the manner of disposing of a used filter sheet and the swarf removed by the magnetic separator.

Other objects and advantages of the invention will become apparent from the following detailed description taken in connection with the accompanying drawings, in which.

The embodiment of the invention shown in the drawings by way of illustration comprises generally a rotary magnetic drum 10 nested compactly within and immediately above a traveling sheet 11 of arcuate form for filtering out material left in the liquid first delivered to the magnetic separator. The filtrate gravitating through the sheet is collected in a receptable 18 formed by the bottom of a box-like housing 13 which supports all of the operating parts of the separator and filter and comprises upstanding parallel end walls 14 and 15 joined by a top wall to which front and back covers 16 are hinged at 17.

Figure 3:
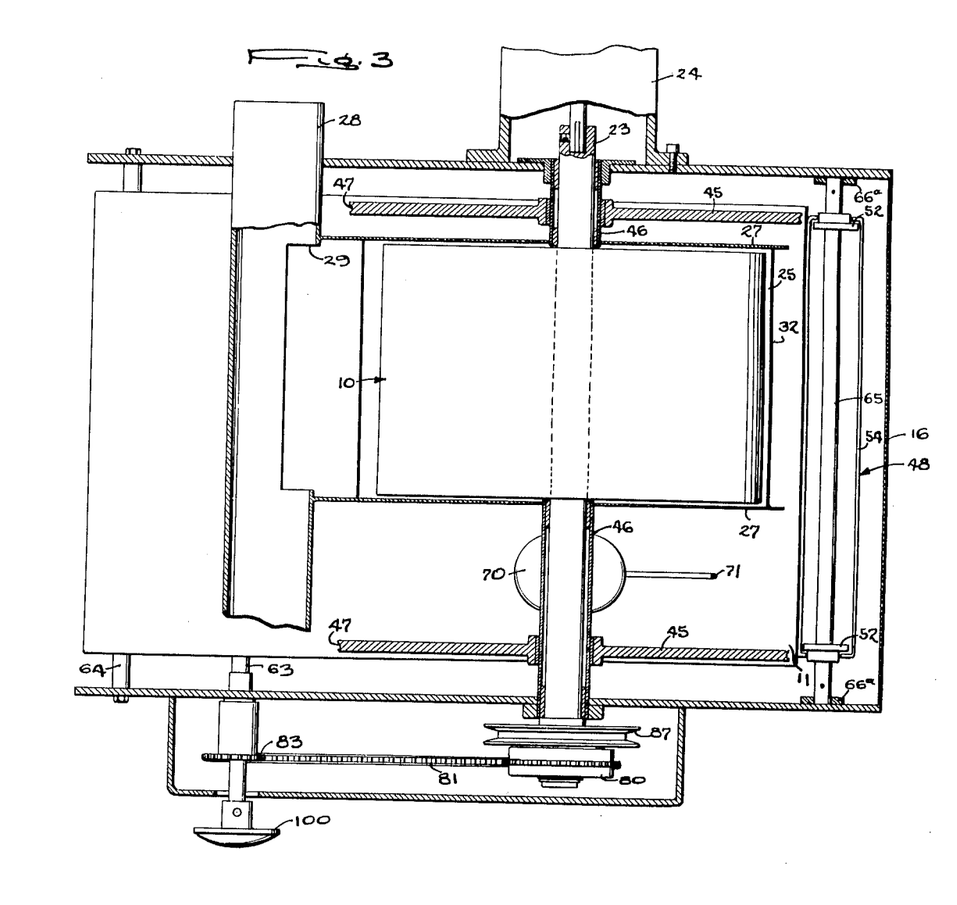
Fig. 3 is a fragmentary horizontal section taken along the line 3—3 of Fig. 1.

The drum of the magnetic separator is of well known construction and comprises a cylindrical nonmagnetic shell 20 (Fig. 4) surrounding the outwardly facing poles of magnets 21 spaced along and around the shell and suitably supported from plates 22 which close the ends of the shell. Magnetic fields are thus created around the entire drum periphery. Extending axially through the drum and secured to the plates 22 is a shaft 23 (Figs. 1 and 3) spanning the housing plates 14 and 15 and journaled in the latter to turn about a horizontal axis. The shaft is turned at slow speed by a motor 24 mounted on the outside side of the housing wall 15 and coupled through a suitable speed reducer to the adjacent end of the shaft 23.

The liquid to be treated is held in contact with the drum periphery by a trough 25 (Figs. 1 to 5) slightly larger than the drum and having an arcuate bottom wall 26 closed by end walls 27 suspended from the shaft 23 close to the ends of the drum and also rigidly connected at one end by an inlet pipe 28 through which the liquid to be filtered is delivered to the trough through an opening 29 in the side of the pipe. The flow of liquid may be adjusted by turning a half sleeve 30 fitting snugly around the pipe. Liquid leaving the opening 29 flows over a ledge 31 which defines the inlet side of the trough. The other side edge 32 is disposed horizontally and below the level of the ledge and constitutes an overflow outlet for the liquid which, in the passage around and below the drum, takes the form of a narrow arcuate band 33 due to submergence of the drum in the liquid held by the trough.

Figure 4:
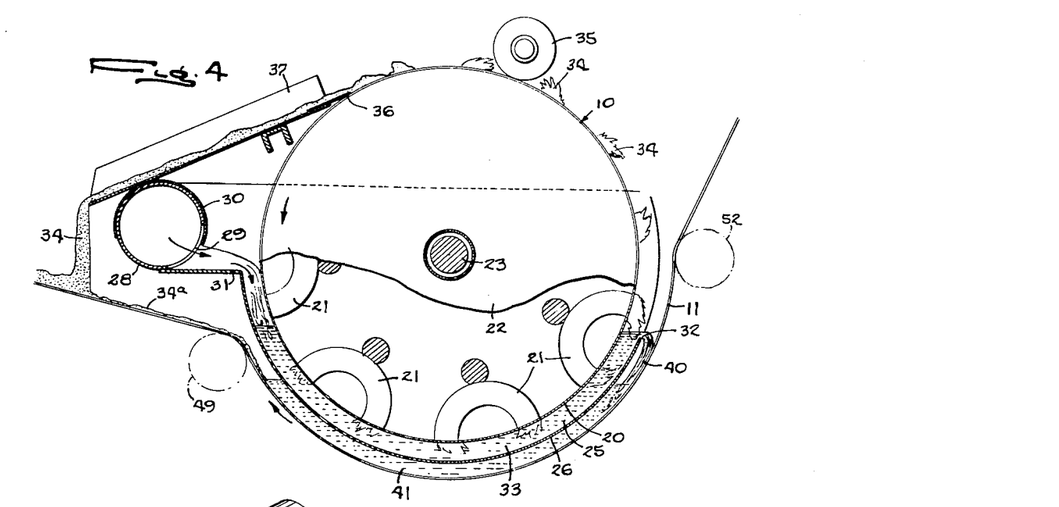
Fig. 4 is a fragmentary section taken along the line 4—4 of Fig. 2.
Figure 5:
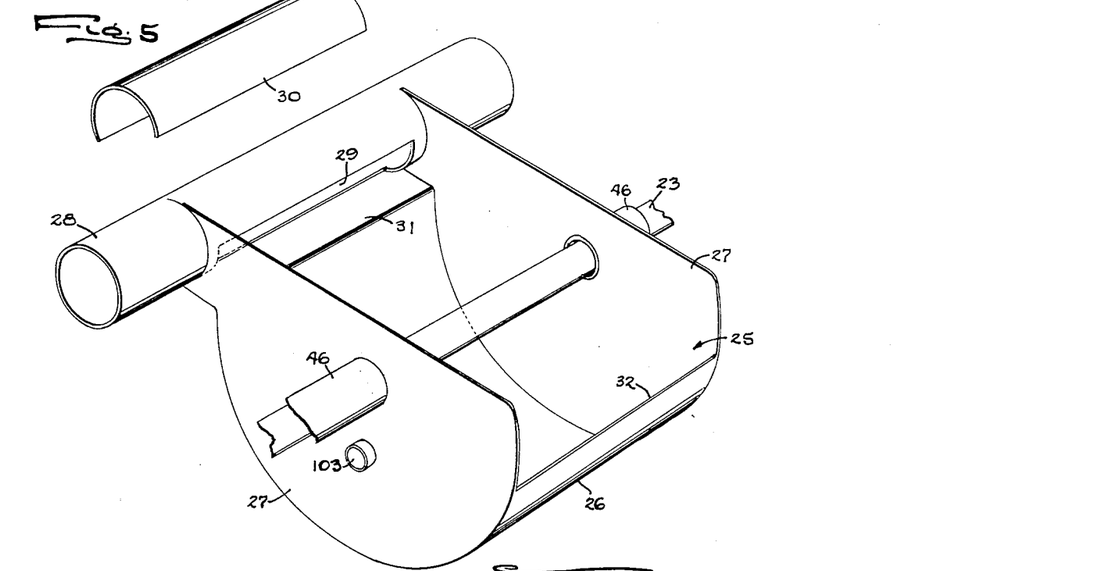
Fig. 5 is an exploded perspective view of the filter trough of the magnetic separator.

With the drum rotating counterclockwise as viewed in Fig. 4, the magnetic particles or swarf 34 attracted to different areas of the drum periphery as they pass around and through the liquid band or pool 33 are carried upwardly and over the top of the drum. Most of the liquid carried by the swarf drains back into the trough or is squeezed out by a roller 35 spring pressed against the top of the drum. A flexible scraper 36 bears against the drum surface beyond the top and deflects the swarf off from the drum and into the upper end of a chute 37 pivoted at one end on a rod 38 spanning the housing end walls. The inlet pipe 28 supports the lower or outer end of the chute which slopes downwardly at a sufficient angle to induce slow but nevertheless positive downward flow of the viscous swarf mass to a point of discharge outwardly beyond the inlet pipe 28.

After flowing around and under the drum 10 and removal of the magnetic particles therefrom, the liquid overflows the outlet edge 32 and is delivered as a curtain-like stream 40 into a pool 41 supported by the flexible filter sheet by which the remaining foreign matter is filtered out, the filtrate gravitating into the receptacle 18. The sheet may be composed of any suitable material such as fabric but preferably is a type of paper having elongated cellulose or plastic fibers extending lengthwise of the direction of advance of the sheet.

The filter sheet is drawn off from a supply roll 44 removably supported on a crossbar 45 in the upper part of the housing. After being led off from the roll, the sheet passes downwardly and around the lower portions of two flat imperforate disks 45 axially spaced apart and cooperating with the intervening area of the sheet 11 to form a receptacle for supporting the liquid pool 41. To permit of close nesting of the magnetic separator and sheet filter, the disks 45 are somewhat larger in diameter than the magnetic drum 10 and its trough 25 and are adapted for free axial floating along sleeves 46 (Fig. 3) on which the disks are journaled loosely, the sleeves being supported by the shaft 23 and the housing end plates.

The outer peripheries of the disks are formed with shallow grooves 47 in which opposite side margins of the filter sheet are pressed to form fluid tight seals. This is accomplished herein by an endless flexible belt or conveyor 48 which spans the two disks and extends around the two drive sprockets 49, flanged idler rollers 50, 51, and adjustable rollers 52, the rollers of each set being disposed in the plane of the associated disk. The conveyor performs the additional function of supporting the filter sheet against substantial sagging over the filtering area. Preferably, the conveyor (see Figs. 6, 7, and 8) comprises a series of cross wires 54 having a bend 55 near each end to dispose a length 56 of the wire at right angles to the straight part 54. The free end portion 57 of the length 56 is bent reversely through slightly more than a half revolution to form a loop 58 through which the end of the next adjacent wire extends to interlock the wires pivotally together and thus form the loops at each margin of the conveyor into an endless flexible chain. The legs 57 of each loop 58 are substantially straight and are offset slightly from the associated cross wire 54 and the successive substantially alined legs on one side, in this instance the free legs 57, coact to form a narrow rib (see Fig. 6) upstanding from the edge of the conveyor. This rib is substantially continuous owing to the lengths of the legs 57, but nevertheless is flexible so that each short section thereof becomes disposed tangent to and fully seated in the bottom of the groove 47. By virtue of such successive line contact between the rib sections 57 and the sheet compressed into the groove, the sheet margins are sealed effectually around the entire bottom of the pool 41. Although the cross wires are spaced outwardly from the drum peripheries and substantial distances apart, they provide adequate support for the sheet 11 over the entire filtering area. The pool 41 defined by coaction of the sheet and the disks 45 may thus be of substantial depth to create a head of liquid sufficient to insure efficient filtering action.

Figure 6:
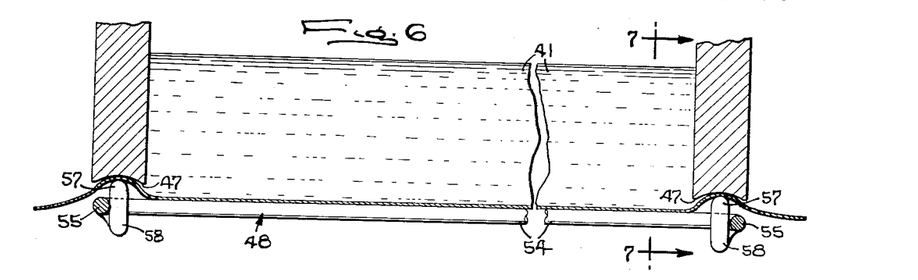
Figs. 6, 7, and 8 are fragmentary sectional views taken respectively along the lines 6—6, 7—7 and 8—8 of Figs. 1, 6, and 1.

By locating the sprockets 49 for toothed engagement with the crossbars 54, the conveyor is driven positively thus leaving the chain links 57, 58 free to perform the sealing function above described. As shown in Fig. 6, the grooves 47 are wider than the thickness of the chains so that the filter sheet is always sealed tightly against the groove bottoms with no danger of rupturing the sheet during its advance with the disks. At the same time, the toothed engagement at opposite side edges of the conveyor holds the crossbars 54 precisely parallel with the shaft 23 thereby maintaining the filter sheet properly centered at all times relative to the disks 45.

Beyond the sprockets 49, the conveyor is inclined upwardly to the rollers 50 which are disposed outwardly beyond the outer end of the chute 37 so that the swarf discharged from the latter falls onto the used part of the sheet 42 and thus becomes combined with the filtered out material 34ª and is thus readily disposed of along with the used filter sheet. Any liquid still remaining in the swarf may, during the successive dwells of the filter sheet, seep through the sheet 11 and drain backwardly along a chute 60 (Fig. 1) from which it is discharged into the filtrate receptacle 18.

Figures 7, 8:
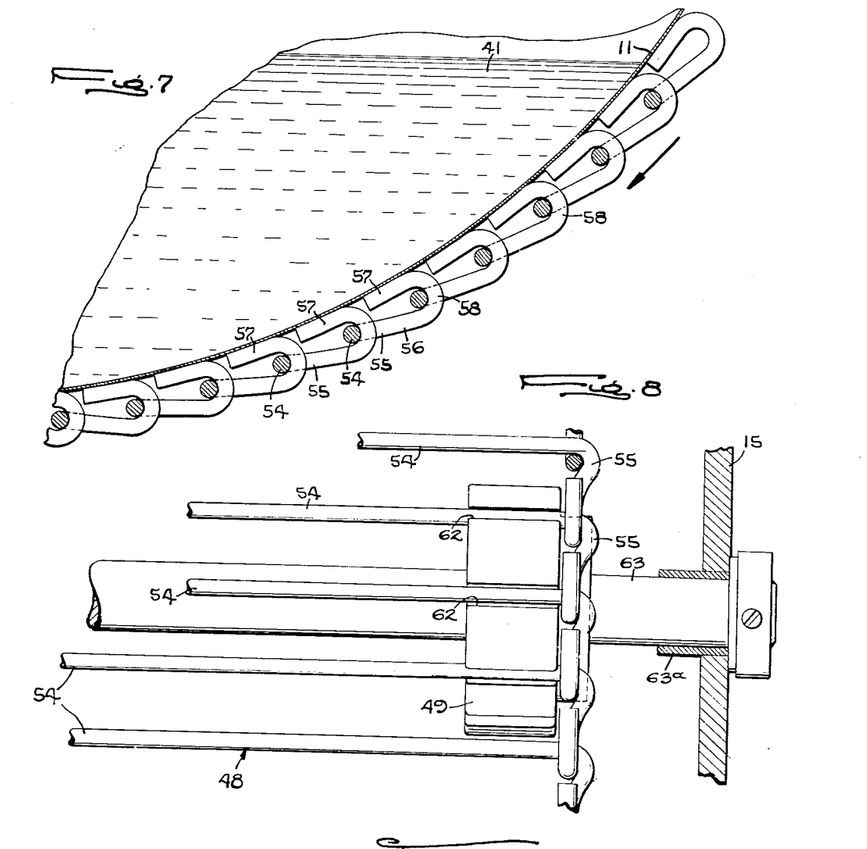

The conveyor 48 is guided against lateral shifting by flanges 61 (Fig. 2) on the rollers 50, 51, and 52 and by the outer ends of the sprockets 49, as shown in Fig. 8, and are formed with notches 62 to receive the crossbars 54 and thus couple the sprockets to the conveyor. The sprockets are fast on a shaft 63 spanning the housing walls 14 and 15 and journaled in bearings 63ª supported by the latter. Each pair of the rollers 50 and 51 is journaled on a crossbar 64 rigidly spanning the walls 14 and 15. The other rollers 52 turn on a crossbar 65 whose opposite ends are received in slots 66 (Figs. 1 and 2) in plates 66ª fastened to the housing walls 14 and 15. The slots extend tangentially of the disks 45 so that contractile springs 67 connected to the bar 65 shift the rollers 52 to hold the conveyor 48 taut and thus seal the sheet margins against the disks 45 under the proper pressure determined by the tension of the springs 67. The sprockets 49 and the adjustable rollers 52 are disposed close to the peripheries of the disks 45 so that the seal extends over the entire intervening portion of the upper run of the conveyor 48.

Figures 10, 15:
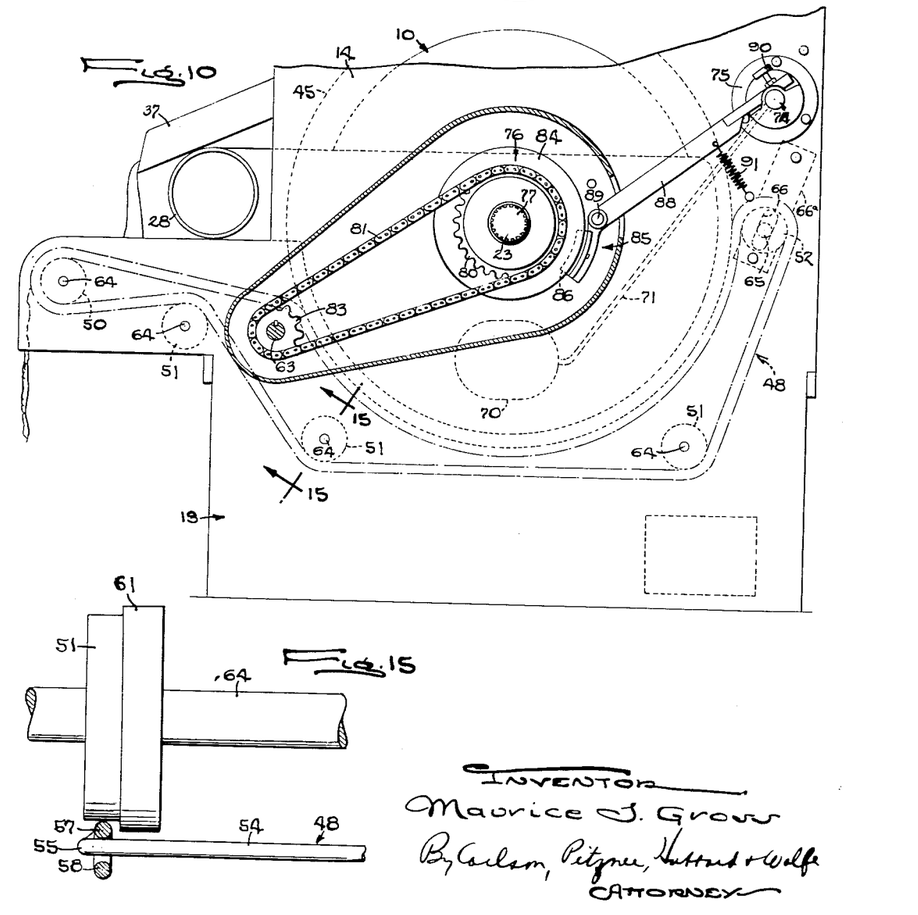
Fig. 10 is a fragmentary side elevational view looking from the left as viewed in Fig. 2.
Fig. 15 is a fragmentary section taken along the line 15—15 of Fig. 10.

The conveyor guide flanges 61 (see Figs. 2 and 15) are sized so that their outer peripheries remain at all times out of contact with the cross wires 54 by which the intervening area of the sheet 11 is supported. In this way, the tension on the conveyor produced by the springs 67 is sustained entirely by the interlocked loops 58.

As the material 34ª filtered out of the liquid pool accumulates on the sheet 11, the filtering capacity of the latter is reduced progressively so that, with a continuing supply of liquid overflowing from the trough 25, the level of the pool will rise. Then, as the sheet is advanced to move fresh paper into the filtering area, the capacity is again increased. Thus, by properly regulating the advance of the sheet, a substantially constant filtering capacity may be maintained.

Changes in the level of the liquid in the pool 41 may be sensed by a float 70 resting on the surface of the pool within an area disposed between the end wall 15 and the adjacent end wall 27 of the trough 25, these walls being spaced apart to permit of such location of the float. Herein the float is secured to one end of a rod 71 inclined upwardly to a rockshaft 72 and attached rigidly to the latter. The rockshaft is supported at one end in a bearing 73 (Fig. 2) on the housing wall 15 and at the other end in a bearing 74 on a bracket 75 secured to the outer side of the wall 14. The shaft thus occupies a definite angular position for each different level of the liquid in the pool 41.

Means controlled by the rocking of the shaft 72 is provided for turning the drive sprockets 49 and increasing the capacity of the filter sheet when the pool level rises above the point desired to be maintained, the sheet advance being interrupted in the present instance when the level falls below the desired point. Herein the drive means includes a coupling for transmitting power derived from the separator drive motor 24 to the shaft 63 carrying the sprockets 49 by which the conveyor 48 and therefore the sheet 42 and the disks 45 are advanced. While the coupling may take various forms it is shown herein as comprising a planetary type differential gear 76 (Figs. 11 and 12) having one terminal element or sun gear 77 fast on the end of the shaft 23 beyond the housing wall 14. This gear meshes with a planet gear 78 on a stud 79 carried by a spocket 80 which thus forms the intermediate or output element of the differential coupling. The teeth of the sprocket mesh with a chain 81 extending around a sprocket 83 fast on the extended end of the shaft 63. The planet gear meshes with the internal teeth of a ring gear 84 which is loose on the shaft 23 and constitutes the second terminal element of the differential.

Figure 1:
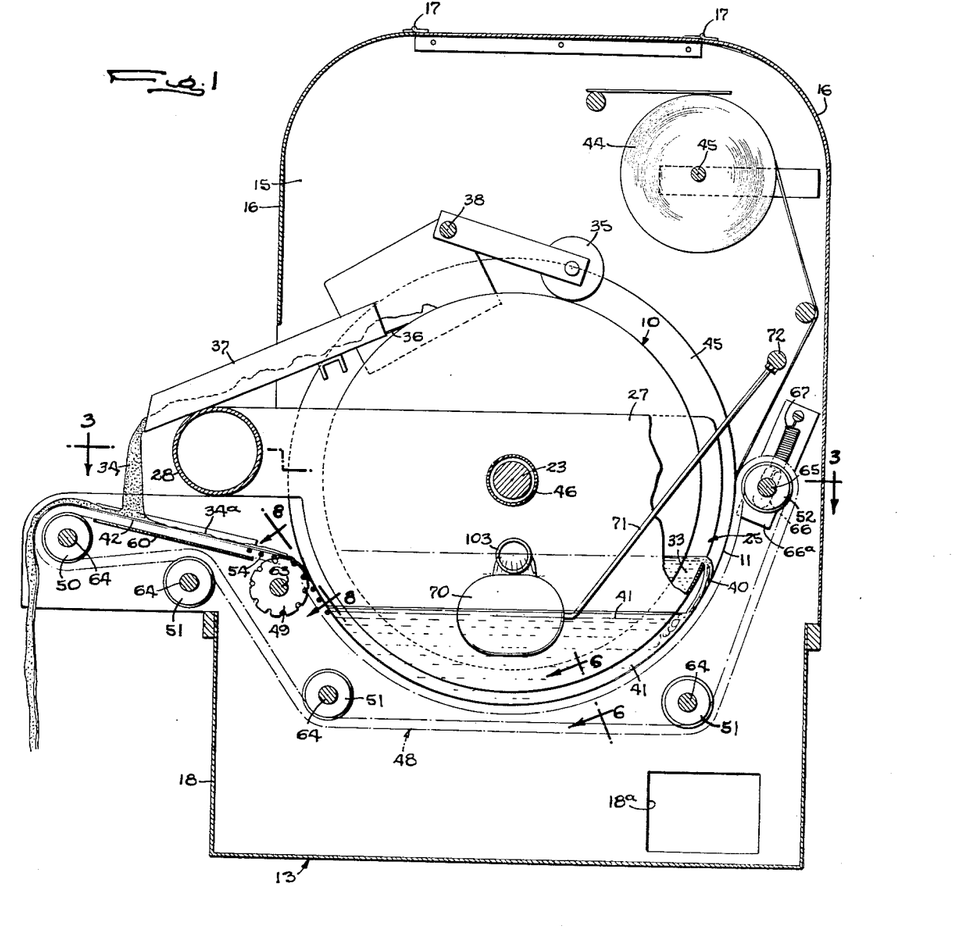
Figure 1 is a vertical sectional view taken along the line 1—1 of Fig. 2 embodying a combined filter incorporating the novel features of the present invention.
Figure 2:
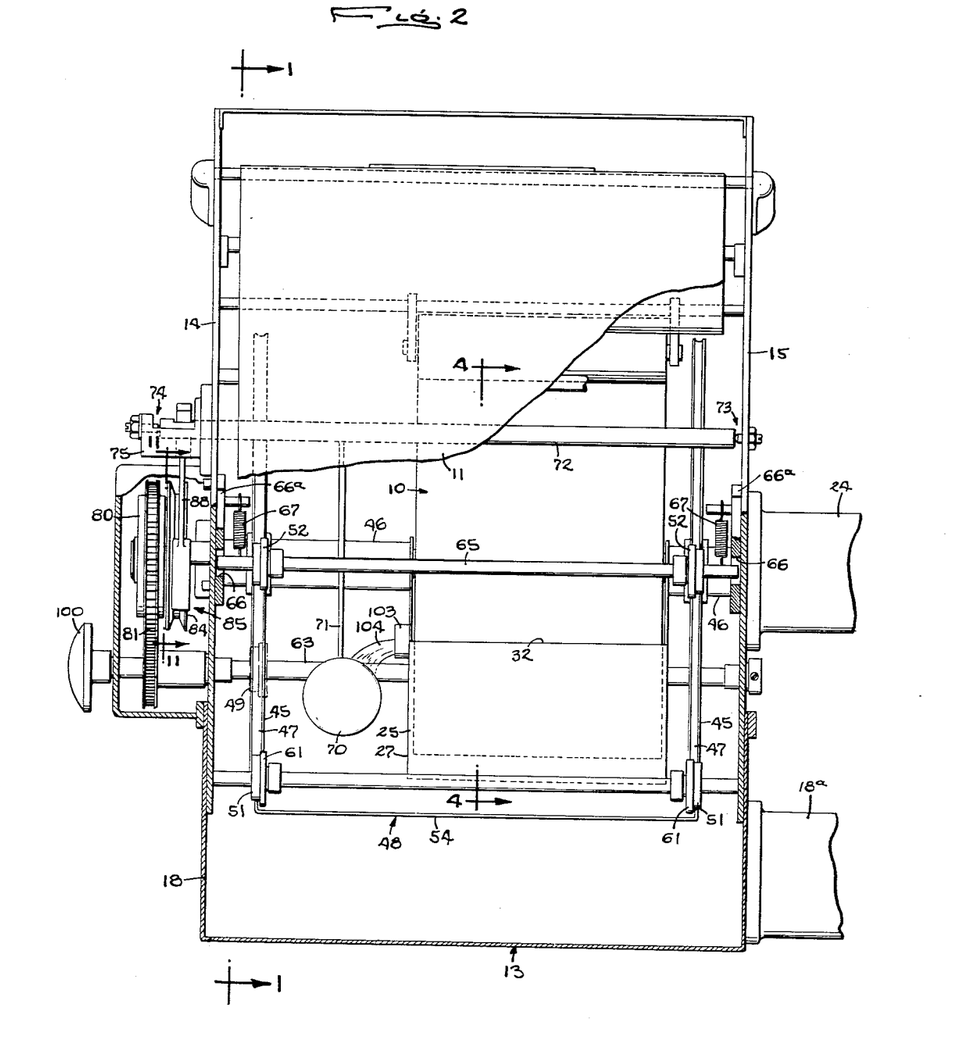
Fig. 2 is a rear view of the improved filter with certain parts broken away and shown in section.

When the ring gear is held against turning, it will be apparent that the motion of the shaft 23 will be transmitted to the sprockets 49 thus advancing the conveyor 48 in the direction indicated by the arrow in Fig. 1. On the other hand, if the ring gear is released it will turn with the drive shaft 23 and no appreciable torque will be transmitted to the sprocket 80. With the drive coupling thus disengaged, the sheet 42 will remain stationary, the area then supporting the pool 41 serving as the filtering medium.

The ring gear is held or released by means of a brake 85 which is energized or deenergized in response to movements of the float actuated shaft in opposite directions away from the position corresponding to the desired level of liquid in the pool 41. In the form shown in Figs. 2, 10, 11, and 12, the float movements are utilized directly to actuate a shoe 86 of a friction brake engageable in a dovetail groove 87 formed in the outer periphery of the ring gear 84. The shoe is attached to the short end of a force augmenting lever 88 fulcrumed at 89 on the housing wall 14. At the end of its long arm, the lever carries an adjusting screw 90 which is held by a spring 91 against a radial surface 92 on the shaft 72. The point of engagement is spaced outwardly from the shaft axis so that when the shaft is rocked clockwise to the position shown in Fig. 11, the shoe 86 is pressed under the force of the spring 91 into the groove 87 thus applying the brake. The drive shaft 23 is then coupled to the sprockets 49 and the conveyor and the filter sheet are advanced.

The advance of a fresh length of the sheet into the filtering area increases the capacity of the latter with the result that the depth of the pool 41 decreases permitting lowering of the float 70. The shaft 72 is thus turned counterclockwise away from the position shown in Fig. 11 thus retracting the shoe 86 to release the brake and thereby interrupt the drive to the conveyor. With the filter sheet thus stopped, its capacity decreases as liquid filters therethrough eventually causing the liquid level to rise and buoy the float upwardly far enough to again apply the brake. The coupling is reestabilshed to again advance the filter sheet. By thus moving fresh portions of the filter sheet into the filtering area intermittently in steps of varying lengths, the depth of the pool 41 may be kept approximately constant in spite of variations in the rate of delivery of the liquid to be filtered or in the load of foreign material carried thereby. The level which s maintained by the automatic float control may be varied by adjusting the screw 90 thereby varying the positions of the float at which the brake 85 is applied and released.

Figures 11, 12, 13, 14:
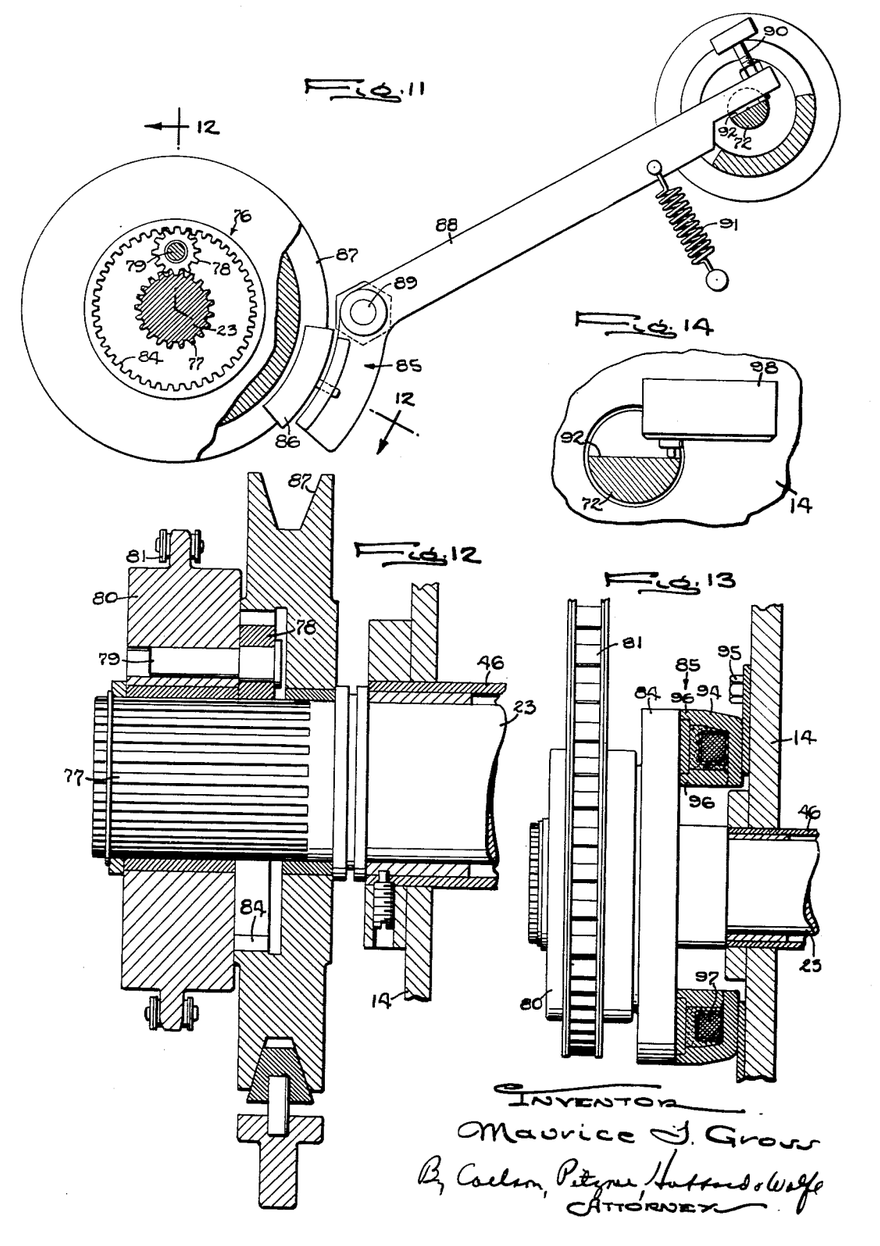
Fig. 11 is a fragmentary sectional view taken along the line 11—11 of Fig. 2.
Fig. 12 is a fragmentary section taken along the line 12—12 of Fig. 11.
Fig. 13 is a sectional view similar to Fig. 12 but showing a modified form of the filter sheet drive mechanism.
Fig. 14 is a fragmentary elevational view of the switch used in controlling the transmission in the form shown in Fig. 13.

If desired, the brake 85 may be actuated by a separate power actuator whose energization is controlled by the float movements. For this purpose, the ring gear 84 may, as shown in Fig. 13, constitute the armature of a ring-like magnet 94 secured by bolts 95 to the housing wall 14. Poles 96 on the friction face of the magnet lie in close proximity to the armature 84 which will, when a winding 97 is energized, be drawn into gripping engagement with the armature thus deriving a friction torque for holding the ring gear against turning. As before, the brake is released and the advance of the sheet is interrupted when the magnet winding is deenergized. Energization and deenergization of the magnet may be controlled by a switch 98 (Fig. 14) mounted on the housing wall 14 and arranged to be closed and opened respectively in response to turning of the shaft 72 away from and back to the position corresponding to the liquid level desired to be maintained.

With the drive coupling above described, the sprocket shaft 63 will be freed for independent turning whenever the coupling is disengaged by release of the brake 85. The shaft may then be rotated manually by grasping a knob 100 fast on the end of the shaft 63 which for this purpose projects outwardly through a casing 101 enclosing the conveyor drive mechanism. Advance of the conveyor 48 by manipulating the knob 100 facilitates insertion of the end of a new supply roll. For this purpose the leading end portion of the new roll is lapped over the trailing end of the previous sheet and, by turning the knob 100, the conveyor is moved to bring the new sheet into filtering position.

There may be, in the case of certain liquids to be filtered, a tendency for some of the foreign material to float on the surface of the pool and adhere to the float. The resulting variation in the weight of the float varies the sensitivity of the control as well as the level that is maintained. This difficulty is overcome in the present instance by delivering part of the liquid overflowing the trough 25 directly onto the float surface so as to continually wash this surface free of foreign matter. To this end, the trough is provided with a second overflow outlet in the form of a short pipe 103 (Figs. 1 and 2) extending through the end wall of the trough and positioned to deliver a small stream 104 of the liquid directly onto the surface of the float. The amount of the liquid thus by-passed constitutes a small part of the total overflow and may be determined by properly sizing the pipe and positioning the same relative to the main overflow control edge 32.

Figure 9:
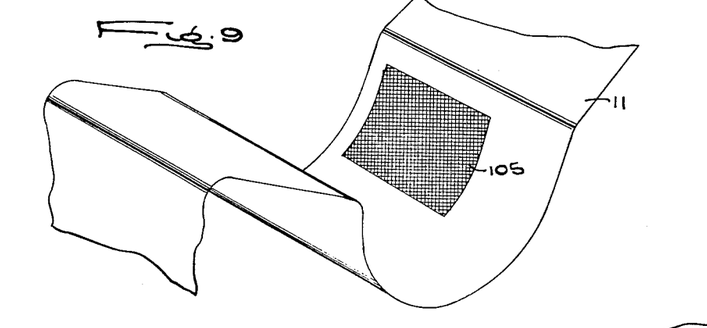
Fig. 9 is a fragmentary perspective view of the filter sheet in its working form.

The pool 41 is normally maintained at a level substantially below that in the trough 25 as determined by the overflow edge 32, this edge being positioned adjacent the downwardly moving side of the sheet 42 so that the stream 40 strikes against the sheet a short distance above the level of the pool. The resulting action of the liquid thus delivered to the pool has been found to increase substantially the filtering capacity of the sheet. That is to say, the momentum of the falling stream as it enters the edge of the pool exerts a scrubbing action on the area 105 (Fig. 9) of the sheet surface and washes downwardly from this area the material immediately filtered out of the liquid as it enters the pool. Thus, this comparatively large sheet area extending the full length of the overflow outlet 32 is kept relatively clean and in effect is used again and again in filtering the liquid at the inlet edge of the pool. As a result, the amount of foreign material filtered out by each unit area of the sheet is increased and the cost of operation of the combined filter using a disposable sheet is reduced correspondingly.

The combined magnetic separator and sheet filter construction as above described operates with unusually high efficiency thus minimizing the cost of the disposable filter sheet. This is due not only to the operation of the separator and filter in succession but also because the liquid is first subjected to the magnetic field in traversing the long and band-like path through the upper part of the liquid pocket 33 and because the liquid from the separator is delivered into the pool 41 at the inlet edge of the latter, that is, where the fresh filter sheet enters the pool. This, together with the action of the stream as above described in washing the sheet area 105 and the accurate float control of the sheet advance make for most effective use of each unit area of the filter sheet.

The successive action above described and the resulting increased effectiveness of the magnetic drum are attributable to the interposition of the separator 26 between the drum 10 and the filter sheet 11. This arrangement is therefore an improvement over that disclosed and generically claimed in application Serial No. 479,557, filed January 3, 1955, by Leslie L. Fowler.

Other operating advantages are also obtained including the combining of the materials removed by the separate units to minimize the loss of liquid and to facilitate ready disposal of the materials. By supporting the filter sheet with the conveyor 48 mounted and driven as described a new filter sheet may be inserted and brought into proper filtering position without interrupting the operation of the unit.

It will be observed that the overall construction is relatively simple due to the mounting of the drive motor and the conveyor drive mechanism on the opposite end walls of the housing. Extreme compactness is achieved in combining the two units by mounting the magnetic drum and the supporting disks of the filter sheet to turn on a common axis and sizing the two so that the separator drum is nested closely within the depressed part of the filter sheet with the trough 25 partially submerged in the filter pool 41.

I claim as my invention:

1. A combined magnetic separator and liquid filter having, in combination, a drum carrying magnetic means producing magnetic fields in the space surrounding the drum periphery, means supporting said drum to turn about a horizontal axis, two rotary disks larger than said drum and mounted beyond the drum ends to turn about said axis, a traveling filter sheet extending around a lower arc of said disks with its side margins sealed to the disks and cooperating therewith to define a pool of liquid extending around the lower part of said drum, means for delivering liquid to be filtered first into said magnetic field and against the drum periphery and then into said pool, and driving means for advancing said filter sheet to bring fresh filtering areas beneath said pool.

2. A combined filter and separator having, in combination, a magnetic drum rotatable about a horizontal axis, a trough beneath said drum supporting a body of liquid submerging the lower part of the drum, said drum incorporating means for creating a magnetic field around the drum periphery and within the liquid body, means for delivering liquid to be filtered into one side of said trough and cause a flow of the liquid around and beneath the drum and over the opposite side of the trough, an elongated filter sheet, means beneath said trough supporting said sheet for endwise movement transversely of said axis and in an arcuate path beneath said trough, the overflow of liquid from said trough gravitating onto said sheet and forming a pool of liquid thereon, mechanism for advancing said sheet along said path and away from the overflow side of said trough, and means regulating said sheet advance to maintain said pool of approximately constant depth.

3. A combined magnetic separator and filter having, in combination, a pair of axially spaced disks, a magnetic drum of smaller diameter and shorter than said disks disposed between the disks, means rotatably supporting said drum and disk to turn about a common horizontal axis, a flexible filter sheet extending around the lower portion of said disks and forming an arcuate wall cooperating with the disks to define a liquid receptacle, driving means for advancing said sheet and turning said disks, an inlet for liquid to be filtered, and means disposed between and extending around said drum and filter sheet and directing the flow of liquid from said inlet in a shallow band around the lower part of said drum and then onto said sheet to form a pool in said receptacle, said last mentioned means comprising a trough having an arcuate bottom partially submerged in said pool to maintain the latter of arcuate shape concentric with said liquid band.

4. A combined magnetic separator and filter having, in combination, a pair of axially spaced disks, a magnetic drum of smaller diameter and shorter than said disks disposed between the disks, means rotatably supporting said drum and disks to turn about a common horizontal axis, a flexible filter sheet extending around the lower portion of said disks and forming an arcuate wall cooperating with the disks to define a liquid receptacle, driving means for advancing said sheet and turning said disks, an inlet for liquid to be filtered, and means disposed between and extending around said drum and filter sheet and directing the flow of liquid from said inlet in a shallow band around the lower part of said drum and then onto said sheet to form a pool in said receptacle.

5. A combined magnetic separator and liquid filter having, in combination, two disks mounted to turn about a horizontal axis, an elongated filter sheet having side margins sealed around lower arcuate portions of said disks and cooperating with the latter to confine a pool of liquid to be filtered through the sheet, driving means for advancing said sheet and turning said disks, a trough spaced above said sheet between said disks with the lower portion of the trough submerged in the liquid of said pool, one side edge of said trough paralleling said axis being positioned to permit the overflow of liquid from said trough and gravitation thereof into said pool, means for delivering liquid to be filtered into said trough at the opposite side edge of the trough, a drum rotatable about a horizontal axis and nested in said trough so as to be partially submerged in the liquid therein, and magnetic means for producing a magnetic field in the space within said trough and around the periphery of said drum.

6. A combined magnetic separator and liquid filter having, in combination, two disks mounted to turn about a horizontal axis, an elongated filter sheet having side margins sealed around lower arcuate portions of said disks and cooperating with the latter to confine a pool of liquid to be filtered through the sheet, driving means for advancing said sheet and turning said disks, a trough of arcuate cross-section spaced above and nested within said sheet between said disks with the lower portion of the trough submerged in the liquid of said pool, the liquid overflowing said trough gravitating into said pool, a drum rotatable about a horizontal axis and nested in said trough above the bottom thereof so as to be partially submerged in the liquid therein, magnetic means for producing a magnetic field in the space between said trough and said drum, and means for delivering liquid to be filtered into said trough.

7. A filter having, in combination, two circular and axially spaced disks mounted to turn on a horizontal axis and having shallow grooves around their peripheries, a flexible filter sheet wider than the spacing of said disks extending around the lower arcuate portions thereof with the side margins overlapping the disk grooves, sets of rollers for each disk disposed in the plane of and on opposite sides of the disk above the lowermost parts thereof, and an endless chain-like conveyor extending around said rollers and the grooves of said disks to seal said sheet margins therein and support the intervening part of the sheet, said conveyor comprising spaced parallel cross-bars supporting the sheet over substantially the entire area thereof between the disks and each having a right angle bend near its end with the end portion beyond the bend bent toward the disk and reversely to form a generally U-shaped loop having a substantially straight free end portion extending circumferentially around and substantially spanning the space between the adjacent bars whereby to seal said sheet in said grooves, the bend of each bar extending through and around the closed end of the loop of the adjacent bar.

8. A filter having, in combination, two circular and axially spaced disks mounted to turn on a horizontal axis and having shallow grooves around their peripheries, a flexible filter sheet wider than the spacing of said disks extending around the lower arcuate portions thereof with the side margins overlapping the disk groove, sets of rollers for each disk disposed in the plane of and on opposite sides of the disk above the lowermost parts thereof, and an endless chain-like conveyor extending around said rollers and the grooves of said disks to seal said sheet margins therein and support the intervening part of the sheet, said conveyor comprising spaced parallel bars having opposite ends angularly bent into the planes of said disks and individually bent to form a U-shaped loop interlocked at the closed end with the adjacent bar and opening away from the latter, the free legs of the successive loops lying tangent to the groove bottom and coacting to form a substantially continuous rib upstanding from the connecting bars and sealing said sheet against the groove bottom.

9. A filter having, in combination, two circular and axially spaced disks mounted to turn on a horizontal axis and having shallow grooves around their peripheries, a flexible filter sheet wider than the spacing of said disks extending around the lower arcuate portions thereof with the side margins overlapping the disk grooves, sets of rollers for each disk disposed in the plane of and on opposite sides of the disk above the lowermost parts thereof, and an endless chain-like conveyor extending around said rollers and the grooves of said disks to seal said sheet margins therein and support the intervening part of the sheet, said conveyor comprising spaced parallel bars having opposite ends angularly bent into the planes of said disks and individually bent to form a U-shaped loop interlocked at the closed end with the adjacent bar and opening away from the latter, the legs of the loops of successive bars on one side thereof being alined and coacting with each other to form a substantially continuous rib upstanding from the bars and effectually sealing the sheet against the bottom of the groove.

10. A combined magnetic separator and liquid filter having, in combination, two disks mounted to turn about a horizontal axis, an elongated filter sheet having side margins sealed around lower arcuate portions of said disks and cooperating with the latter to confine a pool of liquid to be filtered through the sheet, driving means for advancing said sheet and turning said disks, a trough spaced above said sheet with the lower portion of the trough submerged in the liquid of said pool and one side edge positioned to permit liquid to overflow the trough and gravitate into said pool, said trough having an end wall spaced axially from the adjacent disk to expose a portion of the pool surface, means for delivering liquid to be filtered into said trough on the side thereof opposite the overflow, a drum rotatable about a horizontal axis and nested in said trough so as to be partially submerged in the liquid therein, magnetic means for producing a magnetic field in the space around the periphery of said drum, power operated means for advancing said sheet and said disks, mechanism controlling the operation of said power operated means to maintain said pool at a substantially constant level lower than the liquid level in said trough, said mechanism including a float partially submerged in said exposed portion of said pool, and a second overflow outlet extending outwardly from the end wall of said trough to direct a stream of liquid downwardly onto said float to wash off foreign matter tending to accumulate on the float surface.

11. A combined magnetic separator and liquid filter having, in combination, two disks mounted to turn about a horizontal axis, an elongated filter sheet having side margins sealed around lower arcuate portions of said disks and cooperating with the latter to confine a pool of liquid to be filtered through the sheet, driving means for advancing said sheet and turning said disks, a trough spaced above said sheet between said disks and having end walls one spaced inwardly from the adjacent disk to expose a portion of the pool surface, a drum rotatable about a horizontal axis and nested in said trough so as to be partially submerged in the liquid therein, magnetic means for producing a magnetic field in the space around the periphery of said drum, means for delivering liquid to be filtered into said trough and cause overflowing of the liquid from the trough into said pool, and mechanism controlling the operation of said driving means to regulate the advance of said sheet and maintaining said pool at a substantially constant level including a float disposed in the exposed portion of said pool for vertical movement in accordance with changes in the pool level.

12. A combined separator and filter having in combination, a housing having spaced end walls, a horizontal shaft spanning said end walls and journaled in said housing to turn about a horizontal axis, power actuated means mounted on one of said end walls coupled to one end of said shaft to turn the latter, a magnetic separator drum fast on said shaft within the housing, a trough surrounding the lower portion of said drum and receiving liquid to be treated, disks larger than said drum mounted beyond the ends of said trough for independent turning about said axis, a traveling filter sheet extending around the lower portion of said disks and cooperating with the latter to form a receptacle for a pool of the liquid overflowing said trough, sets of rollers disposed on opposite sides of said trough in the planes of said disks, an endless belt-like conveyor extending around said pulleys and beneath said disks to seal the margins of said sheet against the disk peripheries, said mechanism mounted on the other end wall of said housing and operable to transmit rotary power from the adjacent end of said shaft to one of said pulleys whereby to advance said conveyor and said sheet, said mechanism including a disengageable coupling, and means responsive to changes in the liquid level of said pool to control the engagement and disengagement of said coupling to maintain said pool of substantially constant depth.

13. A filter having, in combination, a frame, two disks mounted on said frame to turn about a horizontal axis, an elongated filter sheet having side margins sealed around lower arcuate portions of said disks and cooperating with the latter to confine a pool of liquid to be filtered through the sheet, means for delivering liquid into said pool, sets of pulleys disposed on opposite sides of said disks in the planes thereof, an endless conveyor extending around said pulleys and the lower portions of said disks to seal the margins of the sheet against the disks, a power rotated shaft, differential gearing mounted on said frame and having one of its two terminal elements coupled to said shaft and an output terminal coupled to one of said pulleys to drive said conveyor and advance said filter sheet, the second terminal element of said gearing being normally free to rotate, a brake mounted on said frame and adapted when activated to hold said second terminal element against turning whereby to cause the motion of said shaft to be transmitted to said pulleys, a float disposed in said pool, and means responsive to the movements of said float to control the activation of said brake so as to maintain the depth of said pool substantially constant.

14. A combined filter and magnetic separator having, in combination, a drum rotatable about a horizontal axis and carrying magnets creating a magnetic field around the drum periphery, a filter sheet extending beneath and around the lower portion of said drum, means for advancing said sheet endwise and supporting the same to a point of discharge horizontally spaced outwardly beyond the side of said drum, means for delivering liquid to be filtered against the lower portion of the drum periphery and then onto said sheet to define a filter pool on and above the latter, a scraper engaging the drum periphery near the top thereof, a chute receiving the wet mass of material removed by said scraper and inclined downwardly so as to induce gravitation of the mass outwardly to a point of discharge onto the outwardly extending part of the sheet whereby the magnetic material removed by said drum becomes combined with the material filtered out by said sheet, and a receptacle for catching the filtrate passing through said sheet from said pool and also the liquid from said magnetic mass draining through the sheet outwardly beyond the pool.

15. A filter having, in combination, two circular axially spaced disks mounted to turn about a horizontal axis, a flexible filter sheet wider than the spacing of said disks and underlying and extending around the lower arcuate portions thereof with the side margins overlapping the disks, sets of rollers for each disk disposed in the plane of and on opposite sides of the disk above the lowermost parts thereof, endless flexible chains extending partially around said rollers and disks to seal said sheet margins against the intervening arcuate bottom portions of the disk peripheries, closely spaced parallel bars spanning and joined at opposite ends to said chains and supporting the area of said filter sheet between said disks, said chains and crossbars forming an endless belt conveyor, rotary sprockets having toothed meshing engagement with said crossbars, and means for driving said sprockets to advance said conveyor, said filter sheet and said disks.

16. A filter having, in combination, two circular axially spaced disks mounted to turn about a horizontal axis and having outwardly opening peripheral grooves, a flexible filter sheet wider than the spacing of said disks and underlying and extending around the lower arcuate portions thereof with the side margins thereof overlapping said grooves, sets of rollers for each disk disposed in the plane of and on opposite sides of the disk above the lowermost parts thereof, endless flexible chains extending partially around said rollers and disks and each comprising a series of interconnected links providing a substantially continuous surface pressing said sheet margins into said grooves, closely spaced parallel bars spanning and joined at opposite ends to said chain links exteriorly of said grooves and supporting the area of said filter sheet between said disks, rotary sprockets having toothed meshing engagement with said cross bars, and means for driving said sprockets to advance said chains, said filter sheet and said disks, said grooves being wider than said chains to permit the latter to seal said sheet margins against the bottoms of the grooves.

17. A combined magnetic separator and liquid filter having, in combination, an elongated filter sheet, means including an endless flexible perforated conveyor supporting and shaping said sheet to form an upwardly opening pocket for containing a pool of liquid to be strained through the sheet, mechanism for moving said conveyor to advance said sheet endwise and thereby present new areas of said sheet beneath said pool, a stationary trough narrower than said pocket and nested therein immediately above said pool, said trough being adapted to contain a second body of liquid separated from said pool, means for delivering liquid to said trough for flow therethrough in a direction opposite to the advance of said filter sheet to cause the liquid to overflow the end of the trough and gravitate into said pool, and a magnetic drum rotatable about a horizontal axis and nested in said trough so as to be partially submerged in the liquid therein whereby to attract and remove magnetic particles from the liquid flowing through said trough.

18. A combined magnetic separator and liquid filter having, in combination, an elongated filter sheet, means including an endless flexible and perforated conveyor supporting and shaping said sheet to form a pocket for containing a pool of liquid to be strained through the sheet, a trough disposed in said pocket immediately above said pool and adapted to contain a second body of liquid, means for delivering liquid to said trough to cause the liquid to overflow the end of the trough and gravitate into said pool, mechanism operable intermittently to advance said conveyor and thereby present new areas of said sheet beneath said pool including a float riding the surface of said pool adjacent one side of said trough, a magnetic drum rotatable about a horizontal axis and nested in said trough so as to be partially submerged in the liquid therein, and means for diverting part of the liquid from said trough onto the float to wash foreign matter off from the exposed surface thereof.

19. A combined magnetic separator and liquid filter as defined by claim 17 in which the lower portion of said stationary trough is disposed below the top of said pool and is submerged in the liquid thereof.

20. A combined magnetic separator and liquid filter as defined by claim 17 in which the bottom of said trough curves around the bottom of and is concentric with said magentic drum and extends downwardly into said liquid pool to a point adjacent said conveyor.

References Cited in the file of this patent

UNITED STATES PATENTS

| | | |
|---|---|---|
| 620,786 | Koerper et al. | Mar. 7, 1899 |
| 2,541,202 | Caldwell | Feb. 13, 1951 |
| 2,665,812 | Crane | Jan. 12, 1954 |